Figure 1:
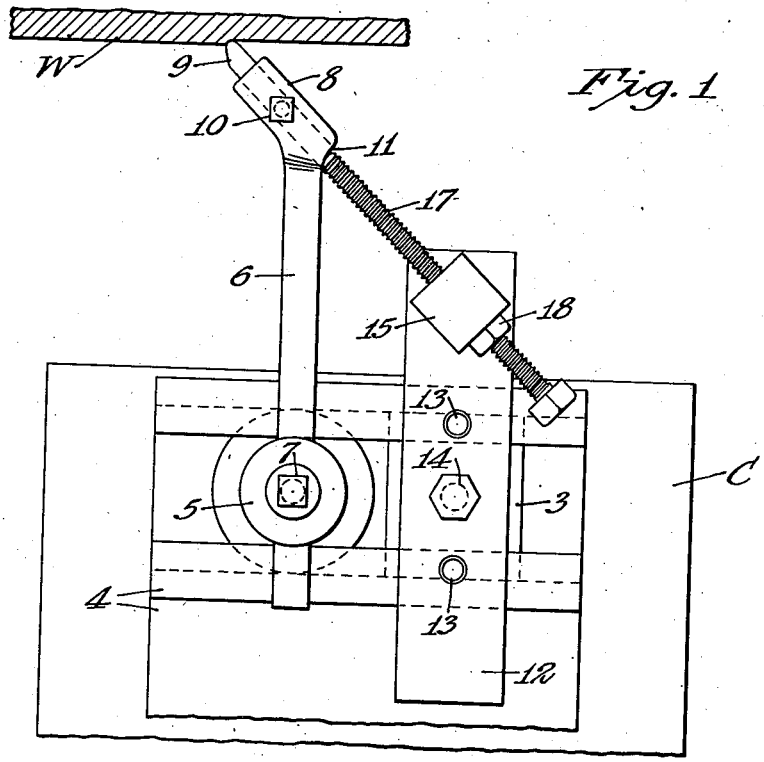

Sept. 12, 1944.    J. H. JACOBS    2,358,230
ADJUSTMENT ATTACHMENT FOR LATHE TOOL HOLDERS
Filed June 26, 1942

Inventor
Joseph H. Jacobs
By Williamson & Williamson
Attorneys

Patented Sept. 12, 1944

2,358,230

UNITED STATES PATENT OFFICE 2,358,230

ADJUSTMENT ATTACHMENT FOR LATHE TOOL HOLDERS

Joseph H. Jacobs, Minneapolis, Minn.

Application June 26, 1942, Serial No. 448,532

1 Claim. (Cl. 82—36)

This invention relates to adjustment attachments for lathe tool holders.

The ordinary lathe tool holder has a head at one end within which a tool is mounted for operation against the work and at the other end of the tool holder a shank is provided which is fixedly mounted. Between the point of support of the shank and the point where the tool engages the work, the tool holder normally has some resiliency and by reason of this resiliency and by reason of the fact that the tool often engages the work with greater or less force at different times an extreme accuracy in positioning of the working edge of the tool cannot be obtained under all conditions.

It is the general object of this invention to provide a novel and improved mechanism which can be employed in conjunction with a tool holder for lathes to eliminate inaccuracies in positioning of the tool held by the tool holder by eliminating the possibility of spring of the tool holder as the tool engages the work.

More specifically it is an object of this invention to provide a novel and improved adjustment attachment for lathe tool holders which will prevent spring of the tool holder and thus maintain the tool held by the tool holder in exact accuracy of position after it has once been properly set.

The objects and advantages of the present invention will more fully appear from the following description made in connection with the accompanying drawing, wherein like reference characters refer to the same or similar parts throughout the various views, and in which—

Figure 2:
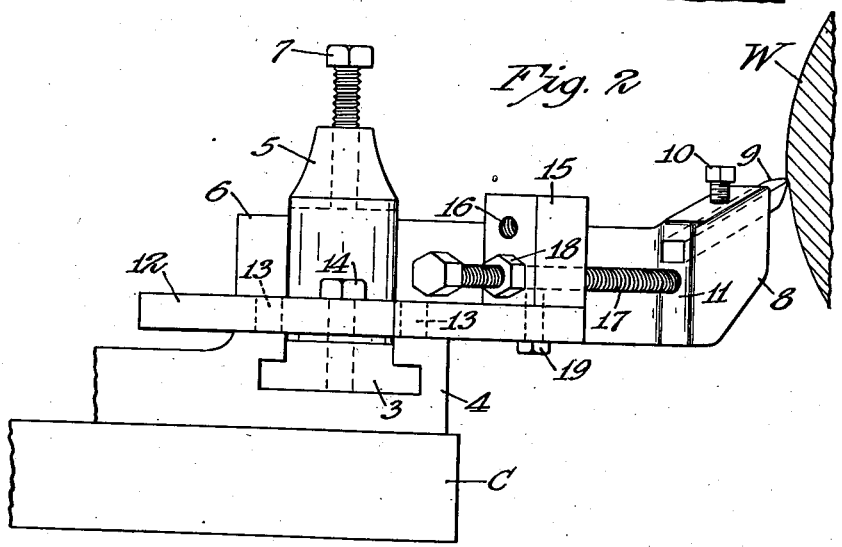

Fig. 1 is a plan view illustrating a tool holder for a machine lathe with embodiment of the invention operating in conjunction therewith; and Fig. 2 is a view in side elevation looking from the right toward the left side of the structure shown in Fig. 1.

Referring to the drawing there are shown certain portions of a metal working lathe and a tool holder therefor, all of which are of conventional construction. The cross feed carriage of a lathe is designated by the letter C and mounted on this carriage is a tool post supporting block 4 which carries a tool post 5 provided with the usual slot within which the shank 6 of a tool holder is mounted, the said shank being secured in place on the post 5 by means of a set screw 7. The tool holder is provided with a slotted head 8 within which a tool 9 is mounted, the said tool being fixed in place by a set screw 10 carried by the head 8. The tool 9 is shown as engaged with the work W. Preferably the tool holder is provided with a shoulder 11 at the rear end of the head 8 as is customary in certain types of tool holders.

In accordance with the invention there is provided a block 3 which fits within the tool post slot of the tool supporting block 4. There is also provided a bar 12 preferably having several openings 13 therein whereby the bar 12 may be secured to the block 3 as by a bolt 14 passing through one of said openings 13 and engaging the block 3. Mounted in upstanding relation at one end of the bar 12 is a block 15 and this block preferably has two or more screw threaded openings 16 therein at different levels. A screw 17 is received within one of the screw threaded openings 16 and this screw is so directed that it sets angularly relative to the shank 6 of the tool holder so that the forward end of the screw may be engaged with the shoulder 11 of the head 8 with the screw extending generally in vertical alignment with the tool 9 carried by the head 8. The screw 17 carries a lock nut 18 which may be drawn up against the block 15 to hold the screw 17 in a desired set position in the block 15.

The block 15 is preferably secured to the end portion of the bar 12 by a screw 19 at the proper angular position so that the screw 17 will align vertically with the tool 9.

In setting up for accurate positioning of the tool 9 to engage with the work W, after the set screw 7 is engaged with the shank 6 of the tool holder, the screw 17 is screwed tightly inwardly against the shoulder 11 of the tool holder so that the head 8 of the tool holder is sprung forwardly of the lathe against the spring tension of the shank 6 of the tool holder to its limit of spring movement. The lock nut 18 is then tightened up against the block 15 whereupon the tool holder is ready for use.

By reason of the fact that the screw 17 has been tightly pressed against the shoulder 11 of the tool holder and is firmly held in this position, it is impossible for the tool holder to spring back away from the work as the tool 9 is carried into the work and thus extreme accuracy of cut is secured by the tool to the exact depth of setting irrespective of the force with which the tool engages the work W at different times. In other words, it is impossible for the tool to yield away from the work by reason of natural spring of the metal forming the shank 6 of the tool holder as is the case when the device of the invention is not employed. The tool 9 is in reality supported by an incompressible triangle and the tool will maintain its exact position with extreme nicety under all conditions.

It will be seen that a highly beneficial device has been provided for securing fixed accurate setting of tools carried by tool holders under all conditions.

It will, of course, be understood that various changes may be made in the form, details, arrangement and proportions of the various parts without departure from the scope of the present invention which generally stated consists in the matter shown and described and set forth in the appended claim.

What is claimed is:

In a tool device for lathes and the like, a tool post, a tool mounted on said post, said tool having a shank movable relative to said tool holder, said shank having an outer end with an abutment thereon, tool engaging means adjacent said abutment, shank bracing means comprising a threaded element movable longitudinally toward and away from said abutment, and a pivoted support for said threaded element, said support and threaded element being swingable toward and away from said shank.

JOSEPH H. JACOBS.